(12) United States Patent
Borjesson et al.

(10) Patent No.: US 8,130,911 B2
(45) Date of Patent: Mar. 6, 2012

(54) CHARACTERISTICS DETERMINATION OF A DIGITAL SUBSCRIBER LINE

(75) Inventors: Per Ola Borjesson, Lund (SE); Fredrik Lindqvist, Alvsjo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1313 days.

(21) Appl. No.: 11/720,618

(22) PCT Filed: Dec. 1, 2004

(86) PCT No.: PCT/IB2004/003955
§ 371 (c)(1),
(2), (4) Date: Jun. 1, 2007

(87) PCT Pub. No.: WO2006/059175
PCT Pub. Date: Jun. 8, 2006

(65) Prior Publication Data
US 2009/0268879 A1 Oct. 29, 2009

(51) Int. Cl.
H04M 1/24 (2006.01)
H04M 3/08 (2006.01)
H04M 3/22 (2006.01)

(52) U.S. Cl. .......... 379/1.03; 379/22.01; 379/24

(58) Field of Classification Search .......... 379/1.01, 379/1.03, 1.04, 22, 22.02, 22.08, 23, 24, 379/29.01, 30; 370/241, 252
See application file for complete search history.

(56) References Cited

U.S. PATENT DOCUMENTS

| | | | |
|---|---|---|---|
| 6,534,996 B1 | 3/2003 | Amrany et al. | |
| 6,819,744 B1* | 11/2004 | Banwell et al. | 379/1.01 |
| 7,023,963 B1* | 4/2006 | Chu et al. | 379/15.05 |
| 7,460,649 B2* | 12/2008 | Ouyang et al. | 379/1.04 |
| 2002/0169585 A1 | 11/2002 | Jones et al. | |
| 2003/0173399 A1* | 9/2003 | Le Henaff | 235/375 |

* cited by examiner

*Primary Examiner* — Quoc D Tran

(57) ABSTRACT

A system, method, and transceiver unit for determining one or more properties of a digital subscriber line (DSL) utilizing a time-variable finite impulse response (FIR) filter. The transceiver unit sends a loop test signal to the line and calculates an impulse response of a reflection of the loop test signal from the line. The calculated impulse response is filtered utilizing the time-variable FIR filter and properties of the line are determined. Characteristics of the FIR filter may be controlled by a set of parameters that vary as a function of time according to a predetermined formula. As a result, the FIR filter provides both high time resolution of closely separated pulses and amplification of far-end pulse reflections.

19 Claims, 5 Drawing Sheets

CHARACTERISTICS DETERMINATION OF A DIGITAL SUBSCRIBER LINE

This application claims priority on International Application No. PCT/IB2004/003955 filed Dec. 1, 2004, the disclosure of which is incorporated herein in its entirety.

FIELD OF INVENTION

The present invention relates in general to the field of data communications and, more particularly, to a method and system to determine one or more properties of a digital subscriber line (DSL) using a time variable finite impulse response (FIR) filter.

BACKGROUND ART

The digital subscriber line (DSL) is a widespread and popular technology that provides high-speed broadband communications to businesses, homes, schools and other consumers over existing telephone lines (conventional twisted pair wire) without disturbing conventional voice telephony. One type of DSL is asymmetric DSL (ADSL), which is a frequency division multiplexing (FDM) scheme that places the upstream and downstream communications in separate, non-overlapping, frequency bands. The bit loading for a particular ADSL subchannel is determined during initialization of the communications session and depends on various transmission channel characteristics or properties of the line (conventional twisted pair wire) between the central office (CO) of the DSL service provider and the customer premises over the range of subchannel frequencies. These properties are also important for initially setting up DSL service at a customer premises.

These line characteristics or properties can be determined using a training sequence that relies upon bidirectional communications between the DSL transceiver at the CO and the DSL transceiver at the customer premises. Such bidirectional communications are often unavailable because a DSL transceiver is not located at the customer premises prior to installation. As a result, measurement of the transmission characteristics or line properties between a CO and a possible customer premises are performed using a single-ended line test (SELT) by measuring the characteristics from the CO end of the connection.

One SELT method to estimate the length and attenuation of a transmission line involves a technique generally called time domain reflectometry (TDR). With the TDR technique a pulse is transmitted on the line and the received echo signal is recorded. The received signal will contain one or several echoes that could come from: the far-end side of the line, bridged taps any cable gauge changes etc. A TDR methodology for loop qualification and characterization is described in Galli et al., "Loop Makeup Identification Via Single Ended Testing: Beyond Mere Loop Qualification", IEEE J. Selected Areas in Communications, Vol. 20, No. 5 (June 2002), pp. 923-935. One difficulty with the traditional TDR method is that the reflected pulse can be heavily attenuated and be difficult to detect, as it is hidden by the rather broad outgoing pulse. To avoid this problem, the pulses can be filtered, but the Galli article suggests to instead subtract the outgoing pulse to get a distinct reflected pulse. Another problem with the traditional TDR method is that for short lines, the outgoing and reflected pulses are close to each other and are difficult to separate. For a very long line, on the other hand, the reflected pulse is heavily attenuated and can be hidden in the noise. As a result, only one pulse is observable in some traditional TDR measurements and it is impossible to know if it is a result of the line being very short or very long.

Current ADSL transceivers often include an integrated broadband SELT function (e.g., Ericsson IP DSLAM EDN110). This poses a challenge when trying to make use of the TDR technique since the ADSL transceiver was not designed for SELT in the first place. In fact, dedicated SELT instruments have metallic contact to the line unlike an ADSL transceiver, which has an Analog Front-End equipped with a transformer. More specifically, the echo transfer function contains a slowly decaying oscillating signal that depends on the transformer and the type of transmission line. In order to catch and amplify the weak far-end reflected pulse a carefully designed filter has to be used. However, a well-designed filter optimized for a cable length of around 1 km will not perform well for a cable length of 4 km, and vice versa. One solution to this problem is to use several filters optimized for different cable lengths, but this solution is expensive and inaccurate.

SUMMARY OF THE INVENTION

The present invention provides a method and system to determine one or more properties of a digital subscriber line (DSL) using a time variable finite impulse response (FIR) filter. The time variable FIR filter can be designed to comply with the requirements encountered when employing the TDR technique in the broadband SELT application. The present invention solves the previously described problems by using a filter whose characteristics can be controlled by a set of parameters that change as a function of time according to a predetermined formula. As a result, the FIR filter provides both high time resolution and amplification of far-end reflections. More specifically, the FIR filter in accordance with the present invention satisfies the following requirements: (1) capability to catch and amplify a very weak far-end reflected pulse normally encountered in the loop plant with TDR; (2) capability to distinguish closely separated pulses, i.e. high time resolution capabilities; (3) linear phase response in the pass-band; (4) no amplitude ripple in the pass-band; (5) controllable band-pass characteristic, i.e. possibility to control the attenuation in the stop band; (6) the impulse response has quick decaying tails without any transition steps at the end points in order to avoid false peaks from near-end echo when performing convolution; and (7) very high attenuation at low frequency despite low order filter.

The present invention also provides a method for determining one or more properties of a line using a transceiver unit by sending a loop test signal to the line via the connected transceiver unit and calculating a reflected loop test signal from the line. The reflected loop test signal is filtered using a time variable FIR filter within the transceiver unit and one or more properties of the line are then determined using the filtered reflected loop test signal. The one or more properties of the line can then be used to configure the transceiver unit for future bidirectional communications with a remote unit. The behavior of the time variable FIR filter can be control using one or more filter parameters, such as N, $\sigma^2$, L and window type w(n).

In addition, the present invention provides a transceiver unit that includes a digital part connected to an analog front end. The digital part generates a loop test signal that is transmitted via the analog front end, receives a reflected loop test signal via the analog front end, calculates a reflected loop test signal and filters the reflected loop test signal using a time variable FIR filter. In operation, the analog front end is connected to a line and the digital part determines one or more properties of the line using the filtered reflected loop test signal. Thereafter, the transceiver unit is configured for future bidirectional communications with a remote unit using the one or more properties of the line.

Furthermore, the present invention provides a system that includes one or more digital subscriber line access modulators, one or more digital subscriber line modems connected to each of the one or more digital subscriber line access modulators, and a line connected to each of the one or more digital subscriber line modems. Each digital subscriber line modem includes one or more transceiver units. Each transceiver unit includes a digital part connected to an analog front end. The digital part generates a loop test signal that is transmitted via the analog front end, receives a reflected loop test signal via the analog front end, calculates a reflected loop test signal, filters the reflected loop test signal using a time variable FIR filter and determines one or more properties of the line using the filtered reflected loop test signal.

BRIEF DESCRIPTION OF THE DRAWINGS

Further benefits and advantages of the present invention will become more apparent from the following description of various embodiments that are given by way of example with reference to the accompanying drawings.

DESCRIPTION OF THE INVENTION

While the making and using of various embodiments of the present invention are discussed in detail below, it should be appreciated that the present invention provides many applicable inventive concepts that can be embodied in a wide variety of specific contexts. The present invention will be described in connection with a central office (CO) digital subscriber line (DSL) modem transceiver. However, this invention may also be used in other applications and implementations including, for example, modulation techniques used for other types of DSL or transceivers outside of the CO. Accordingly, the specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a method and system to determine one or more properties of a digital subscriber line (DSL) using a time variable finite impulse response (FIR) filter. The time variable FIR filter can be designed to comply with the requirements encountered when employing the TDR technique in the broadband SELT application. The present invention solves the previously described problems by using a filter whose characteristics can be controlled by a set of parameters that change as a function of time according to a predetermined formula. As a result, the FIR filter provides both high time resolution and amplification of far-end reflections. More specifically, the FIR filter in accordance with the present invention satisfies the following requirements: (1) capability to catch and amplify a very weak far-end reflected pulse normally encountered in the loop plant with TDR; (2) capability to distinguish closely separated pulses, i.e. high time resolution capabilities; (3) linear phase response in the pass-band; (4) no amplitude ripple in the pass-band; (5) controllable band-pass characteristic, i.e. possibility to control the attenuation in the stop band; (6) the impulse response has quick decaying tails without any transition steps at the end points in order to avoid false peaks from near-end echo when performing convolution; and (7) very high attenuation at low frequency despite low order filter.

Figure 1:
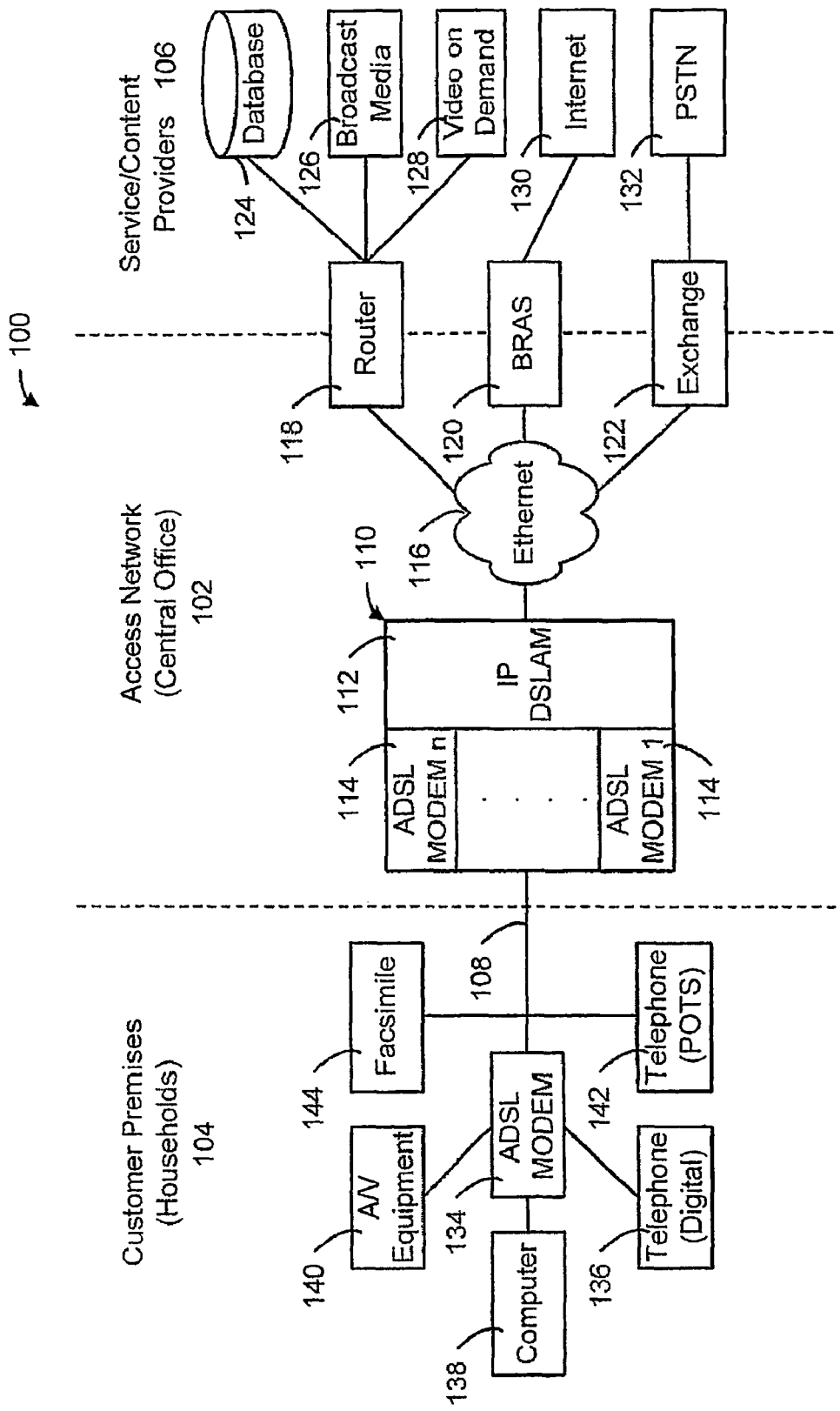
FIG. 1 is a block diagram depicting the architecture of an asymmetrical digital subscriber line (ADSL) system in accordance with the present invention.

Now referring to FIG. 1, a block diagram depicting the architecture of an asymmetrical digital subscriber line (ADSL) system 100 in accordance with the present invention is shown. The ADSL system 100 includes an access network or central office (CO) 102 that connects the customer premises (households, offices, etc.) 104 to various service/content providers 106. Note that the actual ADSL communications are implemented between the CO 102 and the customer premises 104 over a two-wire pair phone line 108 (also referred to as a local loop or a twisted pair line). As shown, the CO 102 provides broadband services to the customer premises 104 using an ADSL service rack 110 that includes one or more Internet Protocol digital subscriber line access multiplexers (IP DSLAM) 110. Each IP DSLAM 110 contains one or more ADSL modems 114. Note that the CO 102 may contain multiple ADSL service racks 110 and various other control, management, switching, routing and remote equipment.

The IP DLSAM 110 is connected to various devices (e.g., router 118, BRAS 120 and telephone exchange 122) to assemble, package and provide services and content from the service/content providers 106 via a network, such as Ethernet 116, or other routing/switching means. For example, database access 124, broadcast media 126 and video on demand 128 are available via router 118. In addition, the Internet 130 is available via BRAS 120, and telephone services 132 (public switched telephone network (PSTN)) are available via telephone exchange 122. The CO 102 assembles the broadband services via the IP DSLAM 112 for appropriate transformation and transmission by one or more ADSL modems 114. Each of the ADSL modems 114 may be in communication via a dedicated twisted-pair telephone line 108 with a suitably configured ADSL modem 134 at customer premises 104.

The ADSL modem 134 at customer premises 104 is configured to process and distribute the multiple broadband services to appropriate destination devices, such as digital telephones 136, computers 138 and audio/visual equipment 140. The customer premises 104 may also have plain old telephone system (POTS) devices, such as analog telephone 142 and facsimile machine 144 integrated on the twisted-pair telephone line 108 along with the ADSL modem 134. Note that in some applications, customer premises 104 may be replaced with another CO 102 or an ADSL repeater.

Figure 2:
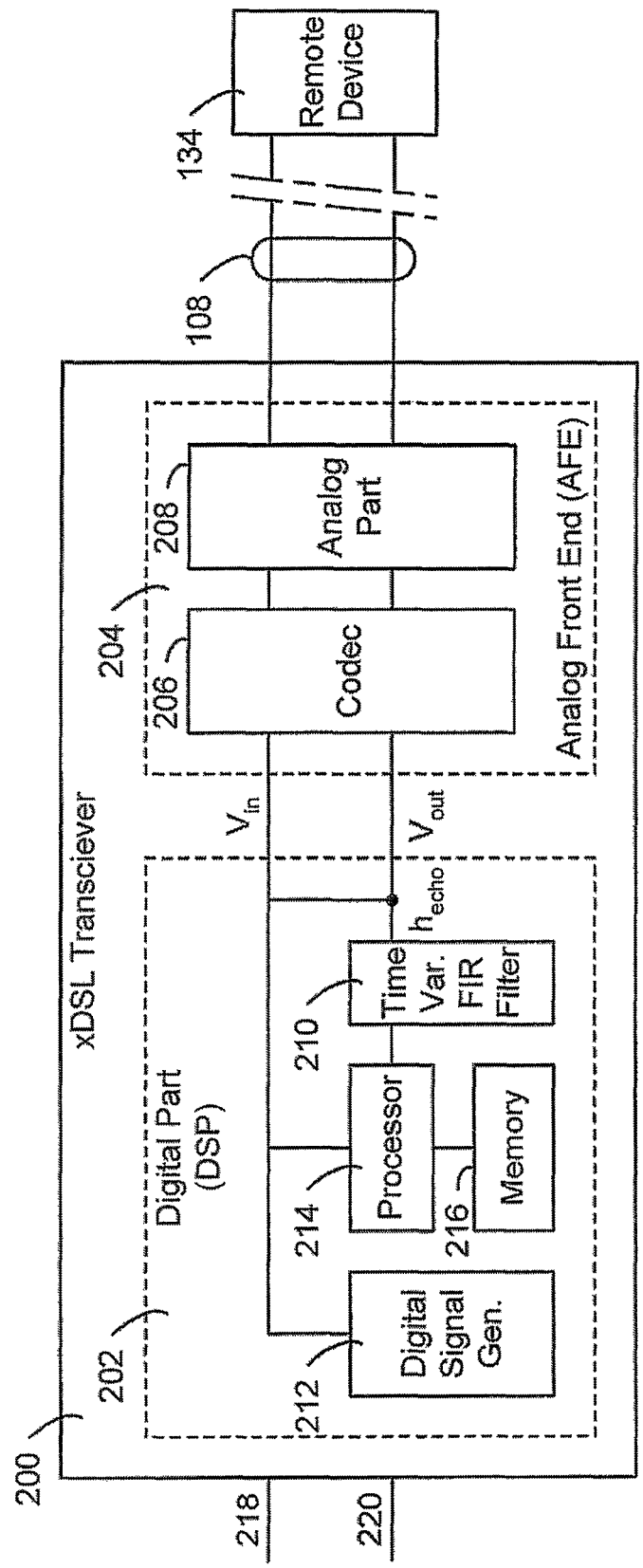
FIG. 2 is a block diagram of a xDSL transceiver unit, which is part of the xDSL modem of FIG. 1 (ADSL), in accordance with the present invention.

Referring now to FIG. 2, a block diagram of a xDSL transceiver unit 200, which is part of a xDSL modem (e.g., ADSL modem 114 of FIG. 1) in accordance with the present invention is shown. The xDSL transceiver unit 200 is configured to transmit signals to and receive signals from the remote device 134 or customer premises xDSL modem via twisted pair phone line 108. In the present embodiment of the invention, the xDSL transceiver unit 200 is only depicted with those blocks necessary to describe the present invention as used to perform time domain reflectometry (TDR) to characterize the transmission line (i.e., the twisted pair phone line 108). As a result, the xDSL transceiver unit 200 has many components and features that will not be described herein.

The xDSL transceiver unit 200 includes a digital part (digital signal processor (DSP)) 202 and an analog front end (AFE) 204, which includes a coder/decoder (Codec) 206 and an analog part 208. The digital part 202 includes a timer variable FIR filter 210, a digital signal generator 212, and a processor or computational device 214 interconnected with memory 216. Although the timer variable FIR filter 210 is shown as part of the digital part 202, in some configurations it can be included as part of the digital side of codec 206 instead. The transceiver unit 200 also has an input 218 and an output 220.

The analog part 208 typically includes a hybrid circuit, and a line driver and receiver. The hybrid circuit, which is connected to the twisted-pair facility serving as transmission loop, is a conventional circuit that converts the two-wire arrangement of the twisted-pair facility to dedicated transmit and receive lines connected to the line driver and receiver. The line driver and receiver is a high-speed line driver and receiver for driving and receiving DSL signals over twisted-pair lines. Line driver and receiver is bidirectionally coupled to codec 206, which carries out analog filtering, analog-to-digital conversion, and some amount of digital filtering. In addition, codec 206 includes serial-in-parallel-out functionality for received signals, and parallel-in-serial-out functionality for signals to be transmitted. ADSL communications are carried out according to a frequency division multiplexing (FDM) scheme in which the upstream and downstream communications are in separate, non-overlapping, frequency bands. In such case, codec 206 filters the incoming downstream signal to eliminate any interference from signals that it is transmitting.

The present invention performs a conventional single-ended loop test (SELT) by applying signals to the loop (line 108) and characterizes the transmission parameters of the loop based on the response of loop to these applied signals. More specifically, the digital signal generator 212, which is connected to processor 214, sends a broadband input loop test signal $V_{in}$ to the remote device 134 via the codec 206, analog part 208 and line 108. A reflected broadband loop test signal $V_{out}$ is received by the digital part 202 via the line 108, analog part 208 and codec 206. The input signal to the time variable FIR filter 210 is the impulse response $h_{echo}(n)$ of the echo transfer channel. The echo transfer function is estimated as $V_{out}(f)$ divided by $V_{in}(f)$, where f denotes frequency and $V_{in}$ is a broadband signal. The impulse response is calculated by the inverse Discrete Fourier Transform of $H_{echo}(f)=V_{out}(f)/V_{in}(f)$, which gives $h_{echo}(n)$, where n denotes time sample number. Thus, $IDFT\{H_{echo}(f)\}=h_{echo}(n)$. In practice, the inverse Fast Fourier Transform (IFFT) would be used instead of IDFT. The time variable FIR filter 210 filters the reflected broadband loop test signal $h_{echo}(n)$, which is also referred to as the calculated reflected loop test signal, and provides a filtered reflected broadband loop test signal to the processor 214. The processor 214 analyzes the filtered reflected broadband loop test signal to determine or estimate one or more properties of line 108.

As will be described in more detail below, the characteristics of the time variable FIR filter 210 can be controlled by a set of parameters N, $\sigma^2$, L and window type w(n) that change as a function of time according to a predetermined formula. Parameter N determines the number of polynomial coefficients, but also the computational complexity when solving the equation system. This parameter also affects the attenuation of the filter, especially in the lower stop-band region. Parameter $\sigma^2$ together with the windowing function or window type w(n) controls the shape of the waveform $p_0(n)$. The width of the main lobe of the time domain waveform is especially controlled by $\sigma^2$, which in turn determines the bandwidth of the band-pass region. Parameter L controls the length of the calculated FIR filter, which also affects the level of attenuation in the stop-band and the time resolution. Using these parameters, the time variable FIR filter 210 provides both high time resolution and amplification of far-end reflections.

Figure 3:
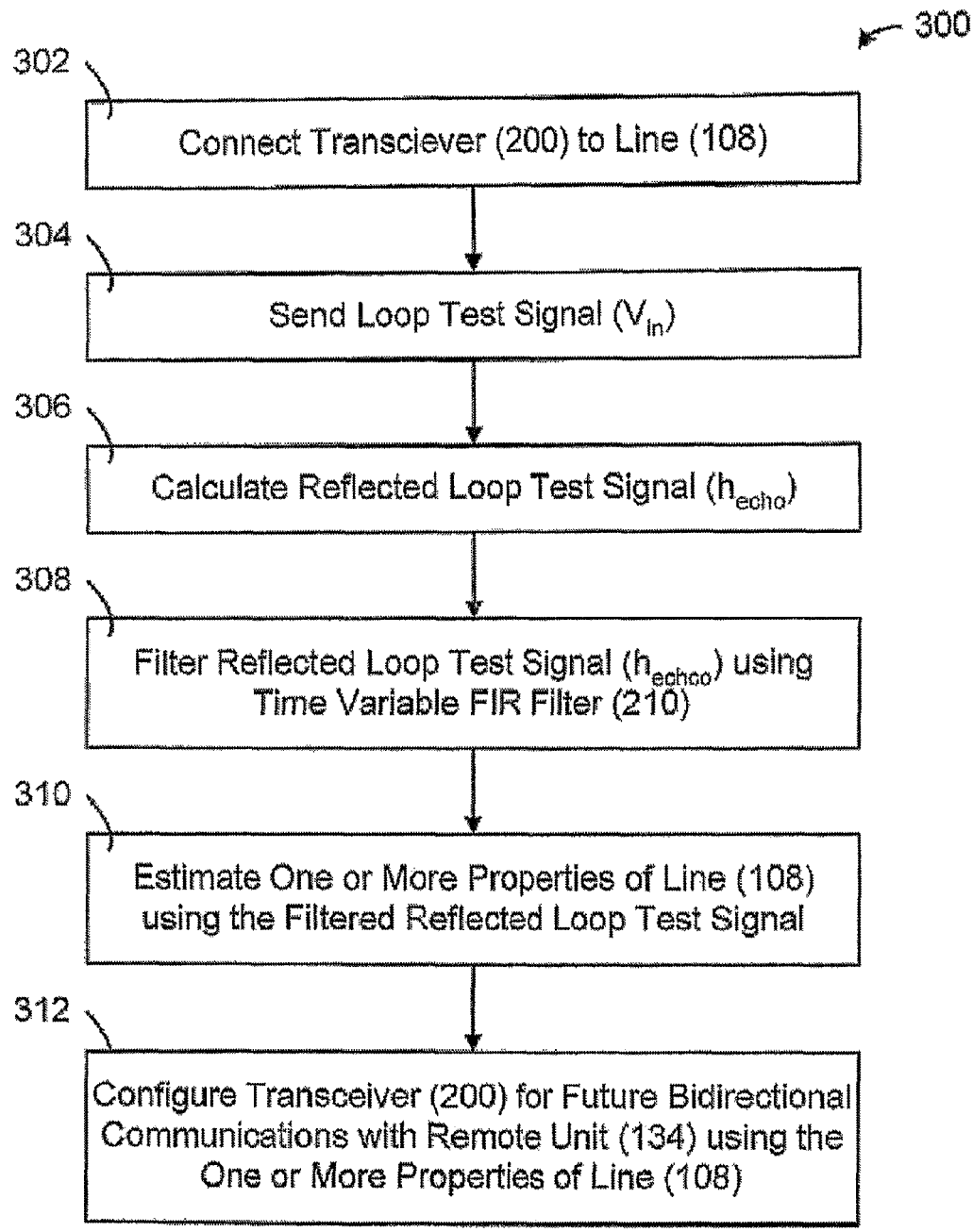
FIG. 3 is a flow chart depicting a method to determine one or more properties of a digital subscriber line (DSL) using a time variable finite impulse response (FIR) filter in accordance with the present invention.

Now referring to FIG. 3, a flow chart depicting a method 300 to determine one or more properties of a digital subscriber line (DSL) using a time variable finite impulse response (FIR) filter in accordance with the present invention is shown. The transceiver unit 200 is connected to line 108 in block 302. A loop test signal $V_{in}$ is then sent in block 304 and the reflected loop test signal $h_{echo}(n)$ is calculated in block 306. The reflected loop test signal $h_{echo}(n)$ is filtered using the time variable FIR filter 210 in block 308. One or more properties of line 108 are then determined or estimated using the filtered reflected loop test signal in block 310. The one or more properties of line 108 are used to configure the transceiver unit 200 for future bidirectional communications with remote unit 134 in block 312. The behavior of the time variable FIR filter 210 can be controlled using one or more filter parameters, such as N, $\sigma^2$, L and window type w(n). For example, the one or more filter parameters may include a first parameter (N) representing the number of polynomial coefficients, a second parameter ($\sigma^2$) and a third parameter (w(n)) controlling the shape of the waveform $p_0(n)$, and a fourth parameter (L) controlling the length of the time variable FIR filter (210), wherein the first, second and fourth parameters (N, $\sigma^2$, L) are real-valued and non-negative. The exact values for these parameters will depend on the specific hardware design. By way of example only, and without limiting the present invention, the first parameter (N) may have a value of 2 to 4, the second parameter ($\sigma^2$) may have a value of 10 to 50, and the fourth parameter (L) may have a value of 10 to 100.

The design of the time variable FIR filter in accordance with the present invention will now be described. The impulse response of a FIR filter can be described as follows:

$$p(n) = \left(1 + a_1 \cdot (n^2)^1 + a_2 \cdot (n^2)^2 + \ldots + a_N \cdot (n^2)^N\right) \cdot e^{-\frac{n^2}{2\sigma^2}} \cdot w(n)$$

where:
  n denotes time sample number,
  w(n) denotes a windowing function of length (2 L+1),
  a represents N real-valued coefficients, and
  $\sigma^2$ is a real-valued constant.

By setting $$p_0(n) = e^{-\frac{n^2}{2\sigma^2}} \cdot w(n)$$

we get $$p(n) = (1 + a_1 \cdot (n^2)^1 + a_2 \cdot (n^2)^2 + \ldots + a_N \cdot (n^2)^N) \cdot p_0(n)$$

From the equation above it can be seen that the impulse response of the FIR filter consists of a polynomial in $n^2$ which is multiplied by a waveform denoted $p_0(n)$. The kernel of the waveform is described by the term $$e^{-\frac{n^2}{2\sigma^2}}$$

where $\sigma^2$ is a design parameter. In addition, by selecting an appropriate windowing function $w(n)$ the waveform can be further shaped, for example smoothened.

The Fourier Transform of $p(n)$ yields $$P(f) = \sum_{n=0}^{\infty} p(n) \cdot e^{-j \cdot 2\pi \cdot f \cdot n}$$

By calculating the derivative of $P(f)$ with respect to $f$ we get $$\frac{\partial P(f)}{\partial f} = \sum_{n=0}^{\infty} p(n) \cdot (-j2\pi n) \cdot e^{-j \cdot 2\pi \cdot f \cdot n}$$

Hence, the k:th derivative yields $$\frac{\partial^k P(f)}{\partial f^k} = \sum_{n=0}^{\infty} p(n) \cdot (-j2\pi n)^k \cdot e^{-j \cdot 2\pi \cdot f \cdot n}$$

Now, the requirement that the first N derivatives at $f=0$ must be 0 is set.
That is $$\frac{\partial^k P(0)}{\partial f^k} = 0, \text{ for } k = 0, 1, 2, \ldots N-1$$

The equation above can be expressed as $$\frac{\partial^k P(0)}{\partial f^k} = \sum_{n=0}^{\infty} p(n) \cdot n^{2k} = 0,$$

which can also be written as $$\sum_{n=0}^{\infty} \left(1 + a_1 \cdot (n^2)^1 + a_2 \cdot (n^2)^2 + \ldots + a_N \cdot (n^2)^N\right) \cdot p_0(n) \cdot n^k = 0,$$

for $k = 0, 1, 2, \ldots N-1$.

Introducing the notation $$S_k^n = \sum_{n=0}^{\infty} p_0(n) \cdot n^k$$

allows the last equation to be written as:

$S_k^n + a_1 S_{k+1}^n + a_2 S_{k+2}^n + \ldots + a_N S_{k+N}^n = 0$, for $k = 0, 1, 2, \ldots N-1$.

Recall that the equation above is valid when $$\frac{\partial^k P(0)}{\partial f^k} = \sum_{n=0}^{\infty} p(n) \cdot n^{2k} = 0, \text{ for } k = 0, 1, 2, \ldots N-1.$$

Thus, for $k=0$, $S_0^n + a_1 S_1^n + a_2 S_2^n + \ldots + a_N S_N^n = 0$ and for $k=1$, $S_1^n + a_1 S_2^n + a_2 S_3^n + \ldots + a_N S_{N+1}^n = 0$ and so on.

By making use of matrix notation the equation system can be expressed as:

$$\begin{pmatrix} S_1^n & S_2^n & \ldots & S_N^n \\ S_2^n & S_3^n & \ldots & S_{N+1}^n \\ \ldots & \ldots & \ldots & \ldots \\ S_{N+1}^n & S_{N+2}^n & \ldots & S_{N+N}^n \end{pmatrix} \cdot \begin{pmatrix} a_1 \\ a_2 \\ \ldots \\ a_N \end{pmatrix} = \begin{pmatrix} -S_0^n \\ -S_1^n \\ \ldots \\ -S_N^n \end{pmatrix} \Leftrightarrow S_{matrix} \cdot a_{vec} = s_{vec}$$

The above system equation is a "square system" where the coefficient vector $a_{vec}$ can be solved by ordinary means, i.e. the solution is $a_{vec} = (S_{matrix})^{-1} \cdot s_{vec}$. The elements of the coefficient vector can now be used, together with the chosen windowing function $w(n)$, to generate the FIR filter according to the first equation.

In practice one could define a windowing function for time span $n = \{-2L, -2L+1, \ldots 0, \ldots, 2L\}$, which is further multiplied with the waveform $$e^{-\frac{n^2}{2\sigma^2}}$$

in order to calculate $p_0(n)$. Thereafter can the equation system be set-up and solved. Thus, the parameters N, $\sigma^2$, L control the design of the FIR filter in the following way:

Parameter N determines the number of polynomial coefficients, but also the computational complexity when solving the equation system. This parameter also affects the attenuation of the filter, especially in the lower stop-band region.

Parameter $\sigma^2$ together with the windowing function $w(n)$ controls the shape of the waveform $p_0(n)$. The width of the main lobe of the time domain waveform is especially controlled by $\sigma^2$, which in turn determines the bandwidth of the band-pass region.

Parameter L controls the length of the calculated FIR filter, which also affects the level of attenuation in the stop-band and the time resolution.

A formula can now be developed using these parameters to control the behavior of one or several of the filter parameters as a function of time and thus provide a time-variable FIR filter.

Figure 4:
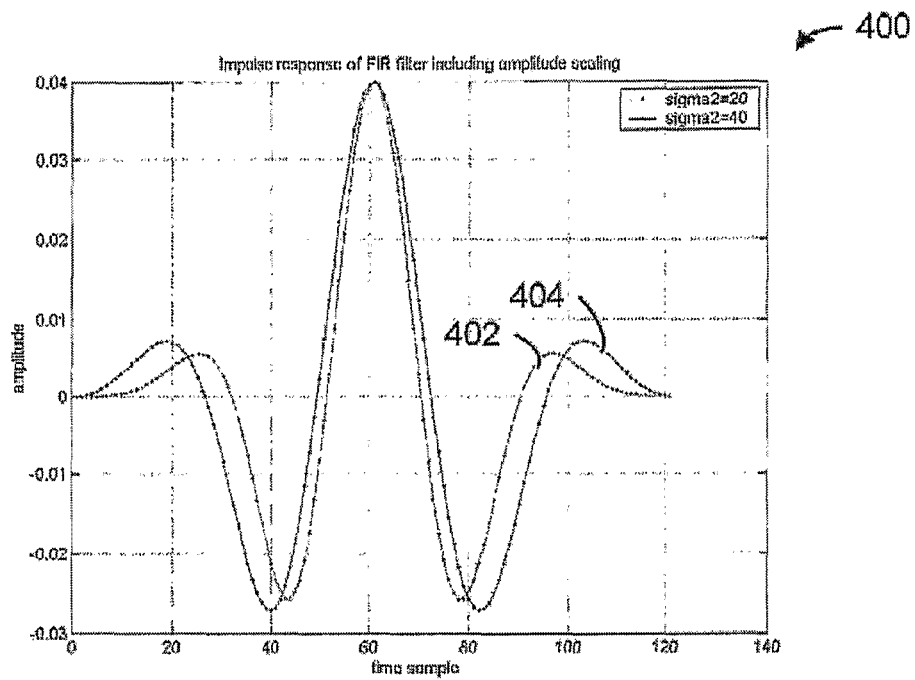
FIG. 4 is an illustration of the impulse response of a FIR filter having parameters N=2, and L=60 when changing $\sigma^2$.
Figure 5:
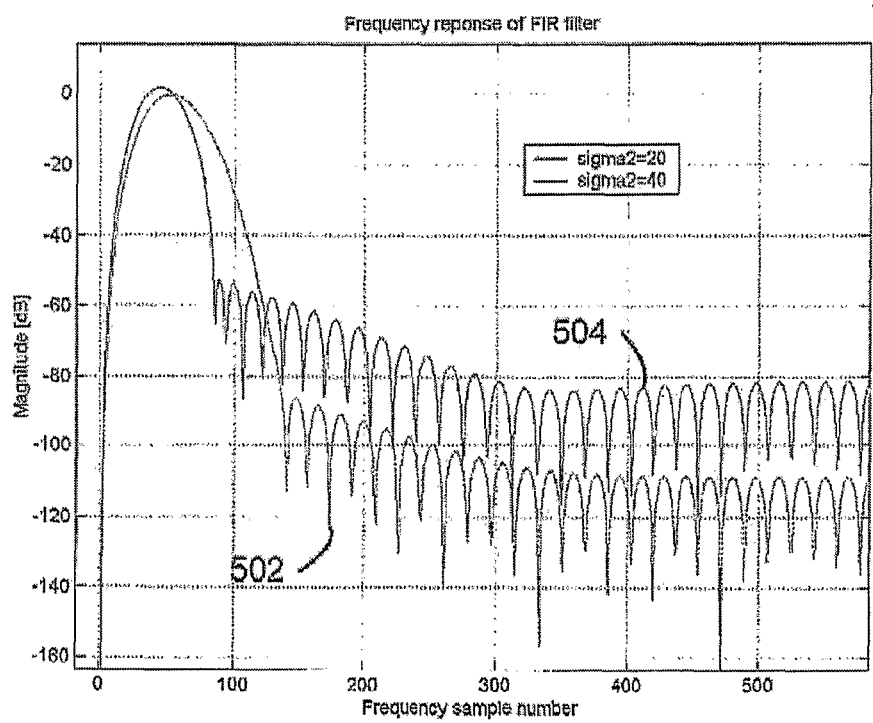
FIG. 5 is an illustration of the frequency response of a FIR filter having parameters N=2, and L=60 when changing $\sigma^2$.

For example, FIGS. 4 and 5 illustrate how $\sigma^2$ affects the FIR filter design. More specifically, FIG. 4 illustrates the impulse response of a FIR filter having parameters N=2, and L=60 when $\sigma^2$=20 (line 402) and $\sigma^2$=40 (line 404). Similarly, FIG. 5 illustrates the frequency response of a FIR filter having parameters N=2, and L=60 when $\sigma^2$=20 (line 502) and $\sigma^2$=40 (line 504).

The capability of the FIR filter algorithm design for use in the broadband SELT application was tested on the Ericsson IPDSLAM EDN110, which was used as the platform for the BB SELT measurements. The object of the filter design presented here is to comply with the two most important requirements of the TDR technique, namely, high time resolution and capability to amplify weak far-end reflections. It should be noted that zero phase non-causal filtering techniques has been found to be advantageous in the broadband SELT application, and hence was employed in the two examples.

Figure 6:
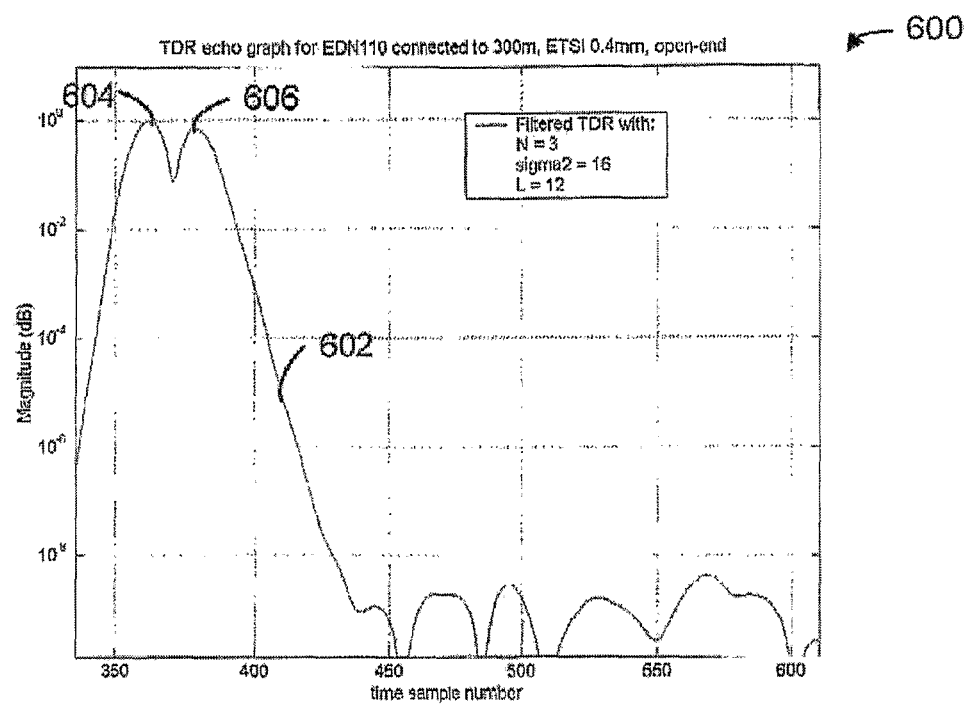
FIG. 6 is an illustration of TDR echo graph for an ADSL modem (Ericsson EDN110) having a FIR filter in accordance with the present invention and connected to 300 m cable of type ETIS 0.4 mm.

Now referring to FIG. 6, an illustration of TDR echo graph for an ADSL modem (Ericsson EDN110) having a high resolution FIR filter in accordance with the present invention and connected to 300 m cable of type ETIS 0.4 mm is shown. Line 602 denotes the filtered TDR signal using a FIR filter having parameters of N=3, $\sigma^2$=16, L=12 and window type w(n)= Blackman-Harris, and demonstrates the capability of the FIR filter algorithm design method to separate closely spaced peaks 604 and 606, i.e. high time resolution capability. The cable used in this example is only 300 m long and terminated with an open-end. The ability to separate closely spaced peaks 604 and 606 also gives the possibility to estimate the attenuation for short range cables.

Figure 7:
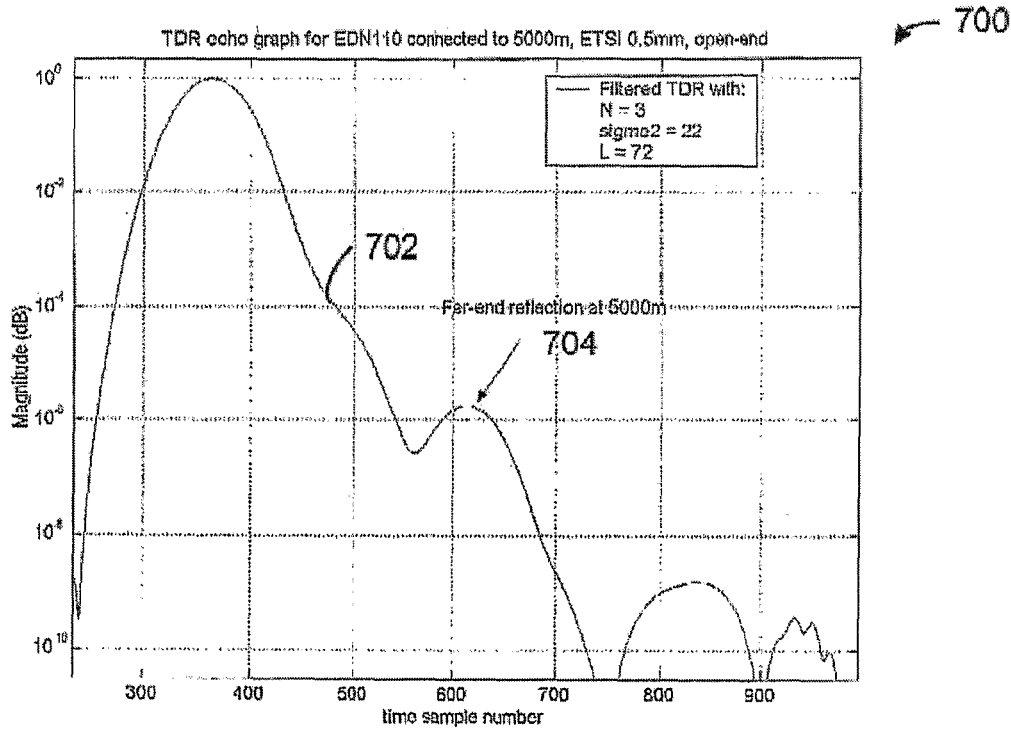
FIG. 7 is an illustration of TDR echo graph for an ADSL modem (Ericsson EDN110) having a FIR filter in accordance with the present invention and connected to 5000 m cable of type ETIS 0.5 mm.

Referring now to FIG. 7, an illustration of TDR echo graph for an ADSL modem (Ericsson EDN110) having a FIR filter capable of amplifying weak far-end reflections in accordance with the present invention and connected to 5000 m cable of type ETIS 0.5 mm is shown. Line 702 denotes the filtered TDR signal using a FIR filter having parameters of N=3, $\sigma^2$=22 and L=72 and window type w(n)=Blackman-Harris, and demonstrates the capability of the FIR filter algorithm design method to amplify weak far-end reflections 704, i.e. capability to measure long cables. The cable used in this example is 5000 m long and terminated with an open-end.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. A method for determining one or more properties of a line using a transceiver unit, said method comprising the steps of:
    sending a loop test signal ($V_{in}$) to the line via the connected transceiver unit;
    calculating an impulse response ($h_{echo}(n)$) of a reflection of the loop test signal from the line;
    filtering the calculated impulse response ($h_{echo}(n)$) using a time variable finite impulse response (FIR) filter within the transceiver unit, wherein the FIR filter is controlled by one or more filter parameters (N, $\sigma^2$, L and window type w(n)) that change as a function of time and provide both high time resolution to distinguish closely separated pulses and amplification of far-end reflected pulses; and
    determining one or more properties of the line using the filtered impulse response.

2. The method as claimed in claim 1, further comprising the step of connecting the transceiver unit to the line.

3. The method as claimed in claim 1, further comprising the step of configuring the transceiver unit for future bidirectional communications with remote unit using the one or more properties of the line.

4. The method as claimed in claim 1, wherein the one or more filter parameters (N, $\sigma^2$, L and window type w(n)) comprise:
    a first parameter (N) representing the number of polynomial coefficients;
    a second parameter ($\sigma^2$) and a third parameter (w(n)) controlling the shape of the waveform $p_0(n)$; and
    a fourth parameter (L) controlling the length of the time variable FIR filter;
    wherein the first, second and fourth parameters (N, $\sigma^2$, L) are real-valued and non-negative.

5. The method as claimed in claim 1, wherein the time variable FIR filter is also adapted to provide at least one of:
    linear phase response in the pass-band;
    no amplitude ripple in the pass-band;
    controllable band-pass characteristics;
    an impulse response having quick decaying tails without any transition steps at the end points in order to avoid false peaks from near-end echo when performing convolution; and
    very high attenuation at low frequency despite low order filter.

6. The method as claimed in claim 1, wherein the time variable FIR filter has an impulse response corresponding to $$p(n) = \left(1 + a_1 \cdot (n^2)^1 + a_2 \cdot (n^2)^2 + \ldots + a_N \cdot (n^2)^N\right) \cdot e^{-\frac{n^2}{2\sigma^2}} \cdot w(n)$$

where:
    n denotes time sample number,
    w(n) denotes a windowing function of length (2L+1),
    a represents N real-valued coefficients, and
    $\sigma^2$ is a real-valued constant.

7. A transceiver unit comprising:
    a digital part comprising a timer variable finite impulse response (FIR) filter controlled by one or more filter parameters (N, $\sigma^2$, L and window type w(n)) that change as a function of time;
    an analog front end connected to the digital part;
    the digital part generating a loop test signal ($V_{in}$) that is transmitted via the analog front end, receiving a reflected loop test signal ($V_{out}$) via the analog front end and calculating an impulse response $h_{echo}(n)$) of the reflected loop test signal; and
    the time variable FIR filter filtering the calculated impulse response ($h_{echo}(n)$) to provide both high time resolution to distinguish closely separated pulses and amplification of far-end reflected pulses.

8. The transceiver unit as claimed in claim 7, wherein the analog front end is connected to a line and the digital part determines one or more properties of the line using the filtered impulse response.

9. The transceiver unit as claimed in claim 8, wherein the transceiver unit is configured for future bidirectional communications with a remote unit using the one or more properties of the line.

10. The transceiver unit as claimed in claim 7, wherein the one or more filter parameters (N, $\sigma^2$, L and window type w(n)) comprise:
    a first parameter (N) representing the number of polynomial coefficients;

a second parameter ($\sigma^2$) and a third parameter (w(n)) controlling the shape of the waveform $p_0$(n); and a fourth parameter (L) controlling the length of the time variable FIR filter;

wherein the first, second and fourth parameters (N, $\sigma^2$, L) are real-valued and non-negative.

11. The transceiver unit as claimed in claim 7, wherein the time variable FIR filter is also adapted to provide at least one of:

linear phase response in the pass-band;

no amplitude ripple in the pass-band;

controllable band-pass characteristics;

an impulse response having quick decaying tails without any transition steps at the end points in order to avoid false peaks from near-end echo when performing convolution; and very high attenuation at low frequency despite low order filter.

12. The transceiver unit as claimed in claim 7, wherein the time variable FIR filter has an impulse response corresponding to $$p(n) = \left(1 + a_1 \cdot (n^2)^1 + a_2 \cdot (n^2)^2 + \ldots + a_N \cdot (n^2)^N\right) \cdot e^{-\frac{n^2}{2\sigma^2}} \cdot w(n)$$

where:

n denotes time sample number, w(n) denotes a windowing function of length (2L+1), a represents N real-valued coefficients, and $\sigma^2$ is a real-valued constant.

13. The transceiver unit as claimed in claim 7, wherein:

the digital part further comprises a digital signal generator, a processor connected to the digital signal generator and the time variable FIR filter, and a memory connected to the processor; and the analog front end further comprises a codec connected to the digital part and an analog part connected to the codec.

14. A system comprising:

one or more digital subscriber line access modulators;

one or more digital subscriber line modems connected to each of the one or more digital subscriber line access modulators;

a line connected to each of the one or more digital subscriber line modems;

each digital subscriber line modem comprising one or more transceiver units; and each transceiver unit comprising a digital part connected to an analog front end, the digital part being adapted to:

generate a loop test signal ($V_{in}$) that is transmitted via the analog front end, receive a reflected loop test signal ($V_{out}$) via the analog front end, calculate an impulse response ($h_{echo}$(n)) of the reflected loop test signal, filter the calculated impulse response ($h_{echo}$(n)) using a time variable finite impulse response (FIR) filter;

wherein the FIR filter is controlled by one or more filter parameters (N, $\sigma^2$, L and window type w(n)) that change as a function of time and provide both high time resolution to distinguish closely separated pulses and amplification of far-end reflected pulses and determining one or more properties of the line using the filtered impulse response.

15. The system as claimed in claim 14, wherein the transceiver unit is configured for future bidirectional communications with a remote unit using the one or more properties of the line.

16. The system as claimed in claim 14, wherein the one or more filter parameters (N, $\sigma^2$, L and window type w(n)) comprise:

a first parameter (N) representing the number of polynomial coefficients;

a second parameter ($\sigma^2$) and a third parameter (w(n)) controlling the shape of the waveform $p_0$(n); and a fourth parameter (L) controlling the length of the time variable FIR filter (210);

wherein the first, second and fourth parameters (N, $\sigma^2$, L) are real-valued and non-negative.

17. The system as claimed in claim 14, wherein the time variable FIR filter is also adapted to provide at least one of:

linear phase response in the pass-band;

no amplitude ripple in the pass-band;

controllable band-pass characteristics;

an impulse response having quick decaying tails without any transition steps at the end points in order to avoid false peaks from near-end echo when performing convolution; and very high attenuation at low frequency despite low order filter.

18. The system as claimed in claim 14, wherein the time variable FIR filter has an impulse response corresponding to $$p(n) = \left(1 + a_1 \cdot (n^2)^1 + a_2 \cdot (n^2)^2 + \ldots + a_N \cdot (n^2)^N\right) \cdot e^{-\frac{n^2}{2\sigma^2}} \cdot w(n)$$

where:

n denotes time sample number, w(n) denotes a windowing function of length (2L+1), a represents N real-valued coefficients, and $\sigma^2$ is a real-valued constant.

19. The system as claimed in claim 14, wherein:

the digital part further comprises a digital signal generator, a processor connected to the digital signal generator and the time variable FIR filter, and a memory connected to the processor; and the analog front end further comprises a codec connected to the digital part and an analog part connected to the codec.

* * * * *

UNITED STATES PATENT AND TRADEMARK OFFICE
CERTIFICATE OF CORRECTION

Page 1 of 1

PATENT NO. : 8,130,911 B2
APPLICATION NO. : 11/720618
DATED : March 6, 2012
INVENTOR(S) : Borjesson et al.

It is certified that error appears in the above-identified patent and that said Letters Patent is hereby corrected as shown below:

In Column 4, Line 48, delete "IP DLSAM" and insert -- IP DSLAM --, therefor.

In Column 12, Line 22, in Claim 16, delete "filter (210);" and insert -- filter; --, therefor.

Signed and Sealed this
Tenth Day of July, 2012

David J. Kappos
*Director of the United States Patent and Trademark Office*